United States Patent [19]
Lindell

[11] 3,838,295
[45] Sept. 24, 1974

[54] RATIOLESS MOS SENSE AMPLIFIER

[75] Inventor: Edward Lindell, Long Beach, Calif.

[73] Assignee: Lockheed Electronics Company, Inc., Plainfield, N.J.

[22] Filed: Feb. 5, 1973

[21] Appl. No.: 329,644

[52] U.S. Cl. ........... 307/238, 307/304, 340/173 CA
[51] Int. Cl. ............................................ H03k 5/00
[58] Field of Search ........... 307/205, 238, 251, 279, 307/304; 340/173 FF, 173 CA

[56] References Cited

UNITED STATES PATENTS

| | | | |
|---|---|---|---|
| 3,267,295 | 8/1966 | Zuk | 307/205 |
| 3,440,444 | 4/1969 | Rapp | 307/205 X |
| 3,493,786 | 2/1970 | Ahrons et al. | 307/238 X |
| 3,560,764 | 2/1971 | McDowell | 307/205 X |

*Primary Examiner*—Herman Karl Saalbach
*Assistant Examiner*—James B. Mullins
*Attorney, Agent, or Firm*—Billy G. Corber; Albert K. Geer

[57] ABSTRACT

A sense amplifier for sensing stored information in a memory system particularly of the integrated circuit type wherein a cross-coupled symmetrical sense amplifier is operated to provide ratioless operation. The invention further utilizes a cross-coupled discriminator to provide improved signal detection which, in conjunction with the ratioless differential amplifier with gated conditional feedback, provides a significant reduction in power, higher operating speed and a reduction in required chip area since minimum geometry devices may be utilized.

6 Claims, 4 Drawing Figures

PATENTED SEP 24 1974 3,838,295

SHEET 3 OF 3

RATIOLESS MOS SENSE AMPLIFIER

The present invention relates generally to sense amplifiers for memory systems and more particularly to a sense amplifier for integrated circuit capacitance-type memory systems.

The Prior Art

In the metal oxide semiconductor field effect transistor (MOS FET) art, generally one FET is the active device and a second FET acts as a load device. Since the resistance of an MOS structure is a function of the source-to-gate bias and channel geometry, it is independent of source-to-drain potential in the saturation region. Thus, an MOS device can be used as a fixed or variable resistor, with the amount of resistance being controlled by the source-to-gate bias. Accordingly, in the usual manner of operation, performance is limited by the ratio of $R_A \cong R_L$, i.e. the output depends upon the ratio of the resistance of the active device to that of the load device.

Ratioless operation occurs where the load device and active device are not on simultaneously, i.e., when the active device is on, the load device is off. An excellent discussion "MOSFET Memory Circuits" by Lewis M. Terman, is found in the Proceedings of the IEEE, Vol. 59, No. 7, July 1971, pages 1044–1058. See also References (7) and (10) of the foregoing article. For transient analysis see "Transient Analysis of Four-Phase MOS Switching Circuits" by Yao Ting Yen, IEEE Journal of Solid State Circuits, Vol. SC–3, No. 1, March 1968, pages 1–5.

In an article entitled "Storage Array and Sense/Refresh Circuit for Single-Transistor Memory Cells" by Stein, Sibling & Doering, 1972 IEEE International Solid-State Circuits Conference, pages 56 and 57, there is discussed a MOSFET sense amplifier. However, analysis indicates that the described sense amplifier has a relatively high power dissipation as a result of the ratio type circuits used. In addition, the active devices used must be larger to provide the required gain and sensitivity.

The present invention improves sense amplifier operation by utilizing three or more clock phases and a ratioless amplifier technique such that the active FET device and the load device are not on simultaneously. When the ratioless sense amplifier is used in conjunction with a cross coupled discriminator greatly improved sensing is realized.

Accordingly, it is a primary object of the present invention to provide a sense amplifier utilizing ratioless techniques.

A further object of the invention is to provide a ratioless sense amplifier in conjunction with a cross coupled discriminator to obtain greater sensitivity, a reduction in power, higher operating speed and a reduction in required area since minimum geometry devices may be utilized.

A further object of the invention is to provide a MOSFET sense amplifier which improves operation and eliminates one or more disadvantages of the prior art.

These and other various objects will become more apparent from the following detailed description when taken with the accompanying drawings, in which.

Figure 3:
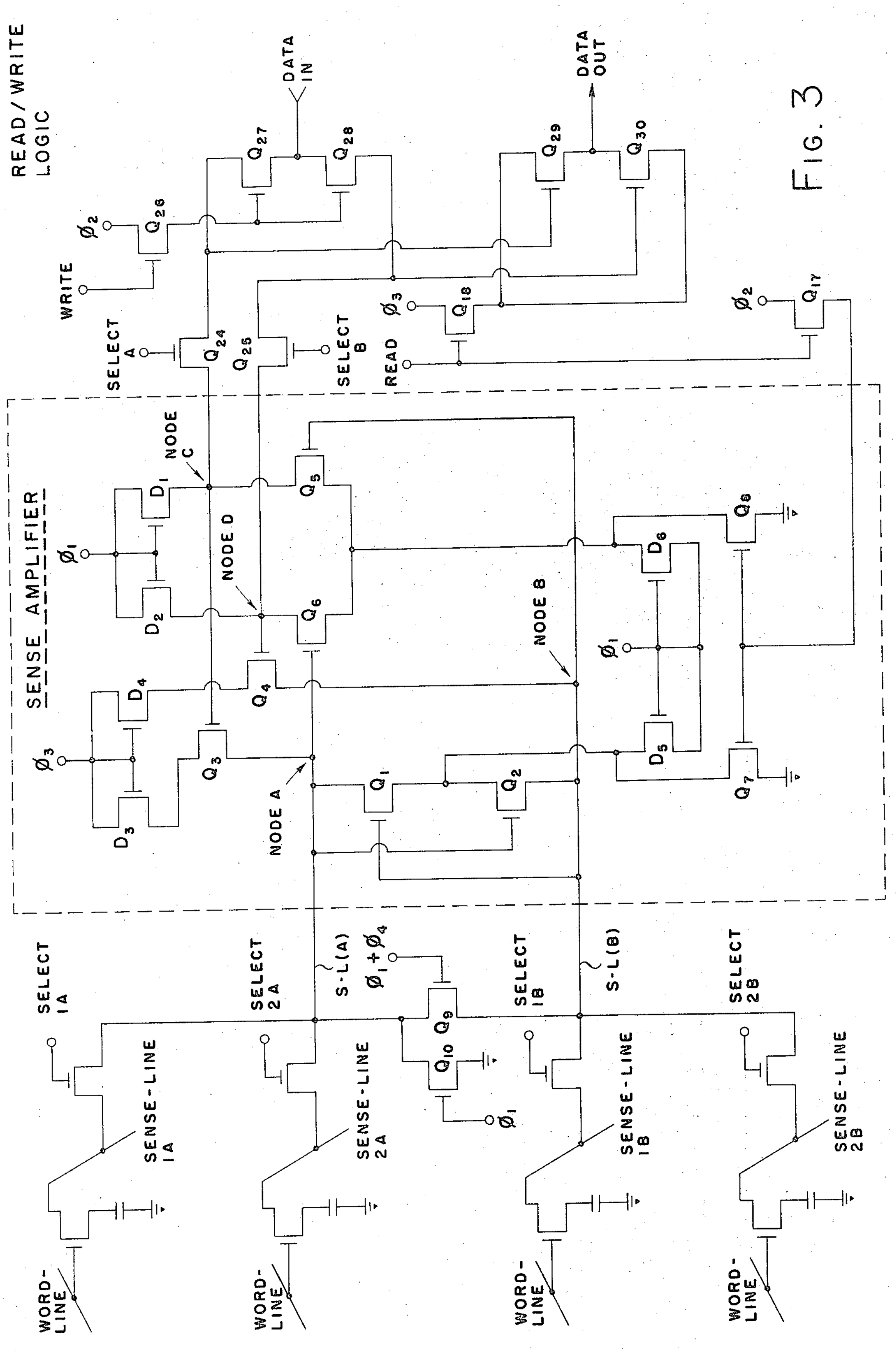
FIG. 3 is a second embodiment of a MOSFET sense amplifier in accordance with the invention.

In the following description, the MOSFET technology is considered to be well understood, and reference to standard texts and handbooks should be made for a detailed consideration of MOSFET's. For example, the devices explained herein, while illustrated by greatly simplified symbols in FIGS. 1 and 3, are understood to have the conventional source and drain terminals, separated by the substrate, over which lies the gate metal.

Figure 1:
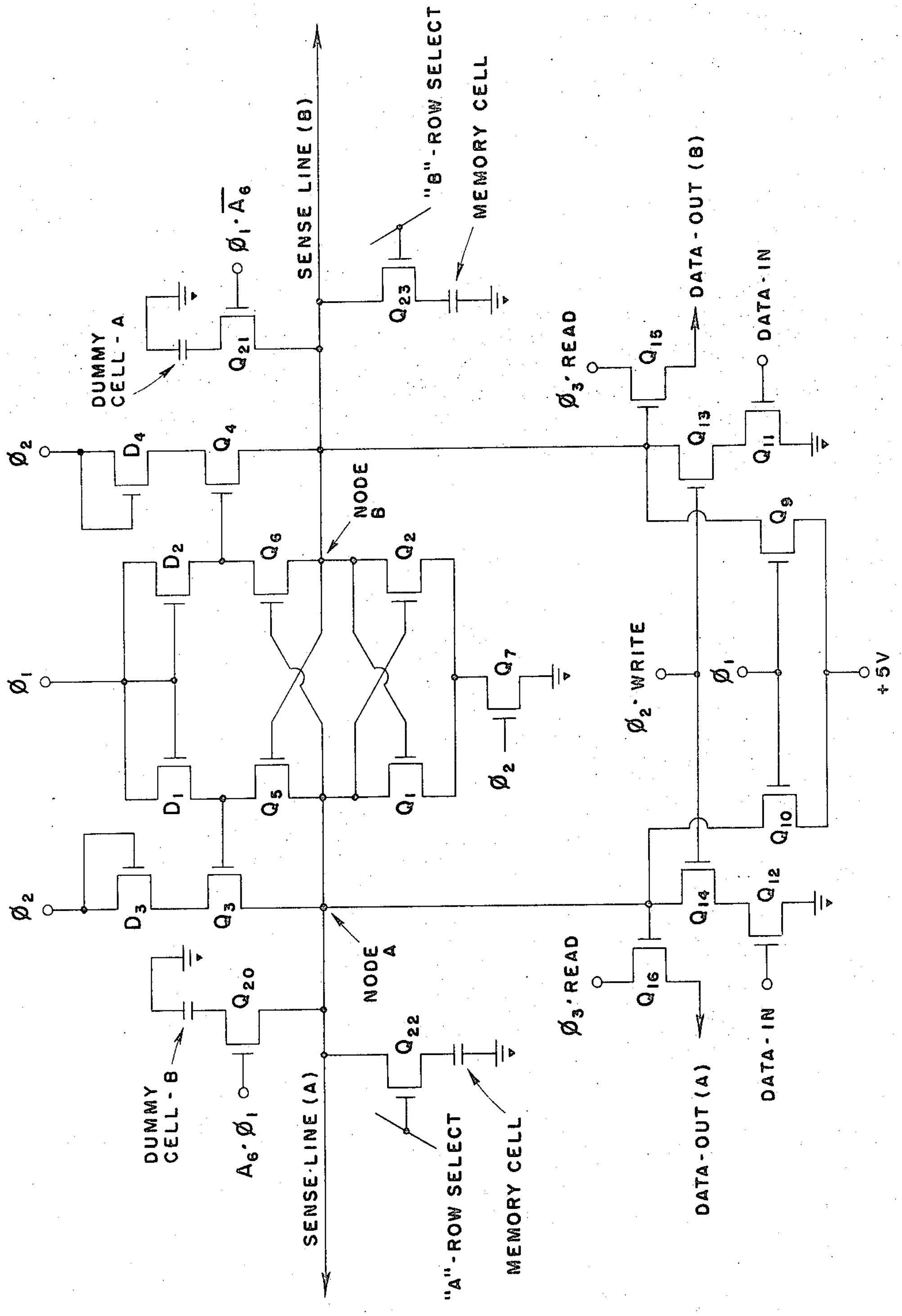
FIG. 1 is a preferred embodiment of a ratioless MOSFET sense amplifier utilizing the present invention.

Now, with reference to FIG. 1, it will be noted that while only a pair of sense lines are shown (sense-line (A) and sense-line (B)), it is understood that the invention is applicable to a sense amplifier which utilizes a plurality of sense-lines per sense amplifier in accordance with conventional technology. Sense-line (A) is connected to a memory cell via A row select $Q_{22}$, while sense-line (B) is connected to a memory cell via B row select $Q_{23}$. Sense-line (A), commonly referred to hereinafter as Node A, is connected to ground through $Q_1$ and $Q_7$, and sense-line B (Node B) is connected to ground through $Q_2$ and $Q_7$. Node A is connected to clock source $\phi_1$ through $Q_5$ and a diode connected FET $D_1$ and Node B is connected to clock source $\phi_1$ through $Q_6$ and diode $D_2$. Node A is likewise connected to clock source $\phi_2$ through $Q_3$ and diode $D_3$, and Node B is connected to $\phi_2$ through $Q_4$ and diode $D_4$. Considering the lower part of FIG. 1, for a read operation, Node A (or B) is read during $\phi_3$·Read by $Q_{16}$ (or $Q_{15}$) and for a write operation, Node A (or B) is connected to ground through $Q_{12}$ and $Q_{14}$ (or $Q_{11}$ and $Q_{13}$) during $\phi_2$·Write. Node A is also connected through $Q_{10}$ to an intermediate voltage, say (+5V), and Node B is connected to the same voltage through $Q_9$, during $\phi_1$.

Figure 2:
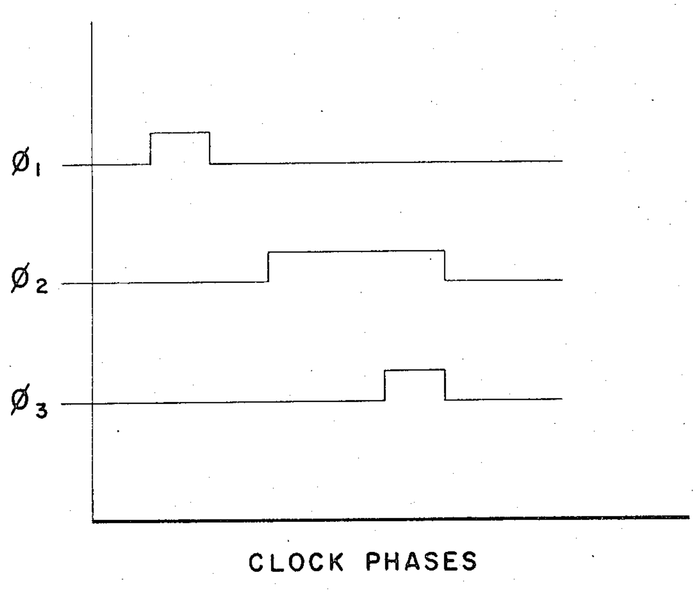
FIG. 2 is a timing diagram showing the relationship of the clock pulses in connection with FIG. 1.

Now considering the operation of FIG. 1 and with reference to the timing diagram of FIG. 2, the sense amplifier operation is divided into two time periods: $\phi_1$ and $\phi_2$. During $\phi_1$, the gates of load devices $Q_3$ and $Q_4$ are precharged through diodes $D_1$ and $D_2$, i.e., $Q_3$ and $Q_4$ are enabled. Simultaneously, sense-lines (A) and (B) are clamped to the intermediate voltage (about +5 volts) when $Q_9$ and $Q_{10}$ are gated "on" during $\phi_1$. Dummy cell transistors $Q_{20}$ and $Q_{21}$ are also gated "on" during $\phi_1$, so that both dummy cells (B and A) are precharged to the balance (or intermediate voltage. Thus, clock phase $\phi_1$ is used to precharge capacitance at all nodes of the amplifier to predetermined potentials.

Activation of the sense amplifier and memory storage cells is accomplished during clock phase $\phi_2$. It will be noted that the $\phi_2$ clock pulse is applied to diodes $D_3$ and $D_4$ and to the gates of $Q_7$, $Q_{13}$ and $Q_{14}$.

During this initial time interval ($\phi_2$, FIG. 2), the following devices are conducting $Q_7$-$Q_1$-$Q_3$-$D_3$ and $Q_7$-$Q_2$-$Q_4$-$D_4$ (recalling that the gates of $Q_3$ and $Q_4$ were precharged during $\phi_1$). Balanced is maintained until the selected row bus (A or B) reaches a voltage high enough to turn on the selected cell transistor 22 or 23. At that point in time, a current unbalance is established which is detected by the amplifier and the regenerative cycle is initiated. A ratio condition exists until $(V_A–V_B) \leq V_{TH}$ (threshold) of $Q_6$ or $(V_B–V_A) \leq V_{TH}$ of $Q_5$. The onset of conduction in $Q_5$ or $Q_6$ bleeds off the charge from the gate of $Q_3$ or $Q_4$, respectively, and establishes the required conditions for ratioless operation.

For example, let it be assumed that a "one" signal was read onto sense-line A by selected transistor $Q_{22}$ and Node A rises. This rise is applied to the gates of $Q_2$ (amplifier) and $Q_6$ (discriminator). Thus, when Node A is a "one" (say +5.5 or +6 volts), the following transistors conduct throughout clock phase $\phi_2$: $Q_7$, $Q_2$, $Q_3$, $Q_6$ and diode $D_3$. Transistor $Q_6$ drains the gate of $Q_4$ and transistor $Q_2$ grounds Node B through $Q_7$. Therefore, transistors $Q_1$, $Q_4$, $Q_5$ and diode $D_4$ are cut off by virtue of the potentials established at their gate nodes. At the completion of clock phase $\phi_2$, sense-line (A) will be charged to about +10 or +11 volts and sense-line (B) will be charged to zero (0) volts. If a "zero" signal had been read on sense-line (A), all devices within the sense amplifier would reverse their respective roles and sense-line (A) would be charged to zero volts, while sense-line (B) would be charged to (+10 or +11 volts). Thus, the sense amplifier is completely symmetrical, can accept read signals on the order of 100 millivolts (MV) and will amplify and charge the selected memory cell to +10 or +11 volts or zero volts, depending upon the information originally stored. Transistors $Q_7$ and diodes $D_3$ and $D_4$ provide the means for turning "on" the amplifier during $\phi_2$ and maintaining it in the "off" state during all other times including $\phi_1$, so that it consumes no power in the "off" state and does not interfere with the precharging of the sense-lines during $\phi_1$.

Data is transferred to a data-out buffer via transistor $Q_{16}$ (or $Q_{15}$) during clock phase $\phi_3$ and "Read" ($\phi_3$·Read). The Read signal is generated by column decoder circuits which are not shown in the accompanying drawings.

Operation of the sense amplifier during a write cycle is similar to that described above, except that transistor $Q_{13}$ and $Q_{14}$ are gated "on" by the column decoder during clock phase $\phi_2$ and Write ($\phi_2$·Write). Thus, if a "one" is to be written into the cell connected to sense-line (A) via transistor $Q_{22}$, transistor $Q_{11}$ would be turned "on", thus clamping sense-line (B) to zero volts. Sensing the current unbalance established, the sense amplifier would charge sense-line (A) to (+10 or +11) volts and charge the selected memory cell, connected to Node A, to a "one" condition. If, instead, a "zero" is to be written, transistor $Q_{12}$ would be turned "on" rather than $Q_{11}$ and sense-line (A) would be clamped to zero volts and the memory cell would be charged to a "zero" condition. In this case dummy cell A is charged to (+10 or +11) volts since it is connected to sense-line (B) via transistor $Q_{21}$. The dummy cell is always charged to the opposite state of the selected cell in both read and write cycle operations. Thus, if the memory cell stores a "one," the dummy cell will store a "zero" and vice versa. The state of the dummy cell is of no consequence since it is charged to an intermediate voltage (say +5 volts) at the beginning of every memory cycle ($\phi_1$). The sole purpose of the memory cell is to maintain an impedance match between sense-lines (A) and (B) during clock phase $\phi_2$. It is believed apparent that additional memory cells may be connected in parallel to that shown and having a row select transistor corresponding to $Q_{22}$ or $Q_{23}$.

Referring now to FIG. 3, a second embodiment of the invention will be described. In this case, similar reference characters are used to designate corresponding devices as previously described. Thus, transistors $Q_1$ and $Q_2$ are the sense amplifier, $Q_5$ and $Q_6$ the cross-coupled discriminator, $Q_3$ and $Q_4$ the load devices, etc. $Q_7$ is now replaced by $Q_7$ and $Q_8$, because of the rearrangement of the sense amplifier and discriminator. It is also to be noted that the sense amplifier-discriminator is within the broken lines, with the memory select circuits on the left and the Read/Write logic on the right. Also referring to FIG. 4, the timing diagram utilizes four clock phases. The dummy cells have been omitted for purposes of clarity. Diodes $D_5$ and $D_6$ have been added, as explained hereinafter.

Figure 4:
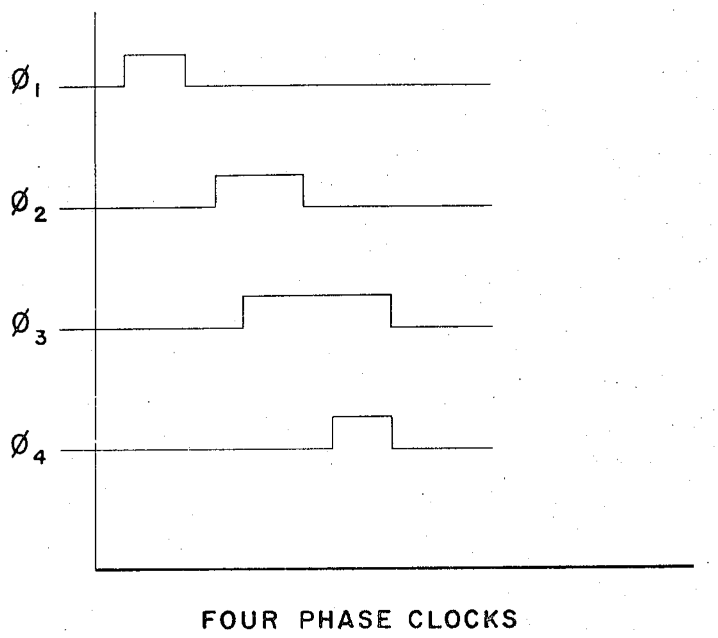
FIG. 4 is a timing diagram showing the relationships of the clock pulse in connection with FIG. 3.

Considering now FIGS. 3 and 4 during clock phase $\phi_1$, lines A and B (Nodes A and B) are balanced and returned to ground or zero volts via $Q_9$–$Q_{10}$, in lieu of to an intermediate voltage, as in FIG. 1. The gates of $Q_3$ and $Q_4$ are charged via diodes $D_1$ and $D_2$. Also, diodes $D_5$ and $D_6$ balance the connection between $Q_1$–$Q_2$ to that between $Q_5$–$Q_6$.

The memory cell is read during $\phi_2$, along with the dummy cell which has been omitted in this Figure. $Q_{17}$ conducts during $\phi_2$·Read, charging the gates of $Q_7$ and $Q_8$. Assuming a "one" has been read from a memory cell, say by "Select 1A", onto sense-line (A), i.e. S-L(A), Node A rises toward the "one" value or about +2 to +3 volts. This voltage is applied to the gates of transistors $Q_2$ and $Q_6$. The unbalance is detected; $Q_2$ conducts via $Q_7$ to reduce Node B to zero; $Q_6$ conducts via $Q_8$ to reduce Node D to zero, discharging the gate of $Q_4$. As the $\phi_3$ clock rises, current through $Q_3$ and $Q_4$ varies proportionally to their gate voltages established during $\phi_2$ or, in other words, inversely to the readout on the sense-lines, i.e., the voltage at the gates of $Q_5$ and $Q_6$. If ($V_s - V_d \leq V_{TH}$) a ratio condition will be present during the time required to raise ($V_s$-$V_d > V_{TH}$). If a "one" has been read (Node A is High, resulting in a high at Node C), the selected digit line (Select A - Read/Write Logic) is raised to its full value ($V_h \geq 12$ volts); "zero" results in a value of ($V_1 \leq 1$ volt). After sufficient time has elapsed to guarantee regeneration, the memory word line is dropped.

Phase four ($\phi_4$) is used to restore an intermediate value "one" into the dummy cell (which is not shown in this Figure). At the end of $\phi_4$ the dummy word line is dropped, thus completing a read cycle.

A write operation has similar time phases, i.e., (1) precharge, (2) load data and (3) regenerate memory cell and restore dummy cell.

All digit lines are restored to zero volts and the gates of $Q_3$ and $Q_4$ are precharged during $\phi_1$, as before. During $\phi_2$·Write, applied to $Q_{26}$, the data is gated onto the gate of $Q_3$ or $Q_4$, via $Q_{27}$-$Q_{24}$ or $Q_{28}$-$Q_{25}$ and select A or B, respectively, while the discriminator and amplifier sections are disabled. Selection of the selected word line (and dummy word line) are also accomplished during $\phi_2$. Regeneration and restore operations are completed in identical fashion as described for a read operation with the exception that the memory cell (and dummy cell) are regenerated during $\phi_3$ and therefore $\phi_4$ is not required in a write cycle. For example, consider a "one" to be written into a memory cell on line A; the data is gated through $Q_{27}$-$Q_{24}$ during $\phi_2$·Write on $Q_{26}$, and raises Node C (gate of $Q_3$). During $Q_3$, diode $D_3$ and $Q_3$ conduct, raising Node A, whereupon selection of the desired word line and Select 1A, 2A, etc. charges the desired memory cell.

Thus, in both FIGS. 1 and 3 the over-all operation is essentially the same. For example, let it be assumed that Node A (select line A) is a "one," i.e. High; after the initial balance is over and the unbalance is detected, the following summarizes the ratioless operation:

FIG. 1:

Node A - "one"
$Q_2$ conducts, $Q_1$ is off
$Q_6$ conducts, the gate of $Q_4$ is discharged
$Q_5$ is off, $Q_3$ conducts.

Thus, with $Q_1$ off and $Q_3$ conducting, the result is ratioless.

FIG. 3:

Node A - "one"
$Q_2$ conducts, $Q_1$ is off
$Q_6$ conducts, the gate of $Q_4$ is discharged
$Q_5$ is off, $Q_3$ conducts.

Thus, likewise, with $Q_1$ off and $Q_3$ conducting, the result is ratioless operation.

What is claimed is:

1. A ratioless MOS sense amplifier comprising: a plurality of memory cells; at least a pair of sense-lines, each of said pair being connected to a group of said memory cells; means for selecting a memory cell and transferring the cell information onto one of said sense-lines; a cross-coupled amplifier pair connected to said sense-lines; a load device for each of said amplifier pair; a cross-coupled discriminator connected to said sense-line and to said amplifier; means responsive to a first clock interval for enabling said load devices; further means responsive to said first clock interval for clamping the sense-lines to a predetermined level; means responsive to a second clock interval for initiating current flow in the amplifier and load devices, whereby an unbalance is created by the memory cell information on the sense line; means including the amplifier and discriminator for detecting the unbalance and raising the selected line to a predetermined level; means for transferring the sense-line information to an output; and means for writing information into a selected cell.

2. A ratioless MOS sense amplifier as defined by claim 1, wherein the amplifier pair is of the MOSFET type and having the drains and gates cross-coupled.

3. A ratioless MOS sense amplifier as defined by claim 1, wherein the load devices are of the MOSFET type, the gates of which are precharged during the first clock interval.

4. A ratioless sense amplifier of claim 1 which is of the MOSFET type, wherein the amplifier consists of at least a pair of MOSFET devices connected individually to at least one sense-line, each of said devices having its drain coupled to the gate of the other device, whereby an unbalance in the sense-lines is detected, and one of said devices conducts and the other is cut off.

5. A ratioless sense amplifier as defined by claim 4, wherein each amplifier includes a MOSFET load device, and means responsive to the unbalance of the sense-lines for turning off the load device associated with the conducting MOSFET amplifier and turning on the load device associated with the nonconducting MOSFET amplifier.

6. A ratioless sense amplifier as defined by claim 5, wherein the last-named means includes a discriminator responsive to the unbalance for controlling the load devices.

* * * * *